US00RE42371E

(19) United States
(12) Reissued Patent
Peyton

(10) Patent Number: US RE42,371 E
(45) Date of Reissued Patent: May 17, 2011

(54) SCROLL MACHINE

(75) Inventor: Jesse Peyton, Piqua, OH (US)

(73) Assignee: Emerson Climate Technologies, Inc., Sidney, OH (US)

(21) Appl. No.: 12/351,536

(22) Filed: Jan. 9, 2009

Related U.S. Patent Documents

Reissue of:
(64) Patent No.: 7,160,088
Issued: Jan. 9, 2007
Appl. No.: 10/671,049
Filed: Sep. 25, 2003

(51) Int. Cl.
*F01C 1/02* (2006.01)
(52) U.S. Cl. ..... 418/55.1
(58) Field of Classification Search ..... 418/55.1; 137/856
See application file for complete search history.

(56) References Cited

U.S. PATENT DOCUMENTS

| | | | |
|---|---|---|---|
| 550,730 | A | 12/1895 | Stone |
| 1,359,006 | A | 11/1920 | Wardwell |
| 1,593,519 | A | 7/1926 | Underwood |
| 2,646,071 | A | 7/1953 | Wagner |
| 2,899,981 | A | 8/1959 | Binks |
| 2,908,109 | A | 10/1959 | Rotwein |
| 3,060,959 | A | 10/1962 | Foster |
| 3,176,712 | A | 4/1965 | Ramsden |
| 3,516,766 | A | 6/1970 | Monden et al. |
| 3,568,712 | A | 3/1971 | Rinehart |
| 3,790,311 | A | 2/1974 | Butts et al. |
| 3,891,000 | A | 6/1975 | Melnick |
| 4,277,955 | A | 7/1981 | Parker |
| 4,369,808 | A | 1/1983 | Hagman |
| 4,369,812 | A | 1/1983 | Paradis et al. |
| 4,427,351 | A | 1/1984 | Sano |
| 4,431,388 | A | 2/1984 | Eber et al. |
| 4,513,784 | A | 4/1985 | Farrand et al. |
| 4,531,543 | A | 7/1985 | Markley |
| 4,560,330 | A | 12/1985 | Murayama et al. |
| 4,580,604 | A | 4/1986 | Kawaguchi et al. |
| 4,744,737 | A | 5/1988 | Yamamura et al. |
| 4,759,696 | A | 7/1988 | Ishiai |
| 4,826,409 | A | 5/1989 | Kohayakawa et al. |

(Continued)

FOREIGN PATENT DOCUMENTS

EP 0589667 A1 3/1994

(Continued)

OTHER PUBLICATIONS

Examiners First Report received from the Australian Government IP Australia dated Dec. 15, 2009 regarding Application No. 2004212516.

(Continued)

*Primary Examiner* — Hoang M Nguyen
(74) *Attorney, Agent, or Firm* — Harness, Dickey & Pierce, P.L.C.

(57) ABSTRACT

A compressor includes a normally open discharge valve assembly for controlling compressed refrigerant flow from the discharge chamber through the compression members. This controlling of flow results in an increased performance for the compressor by reducing recompression volume and the elimination of reverse rotation at shut down. The discharge valve assembly includes a valve seat, a valve plate and a valve stop secured within a recess formed within the compressor with a wave ring retainer. The valve stop and the valve seat include a contoured surface that is engaged by the valve plate when it opens and closes. The contoured surface controls the movement of the valve plate.

33 Claims, 5 Drawing Sheets

U.S. PATENT DOCUMENTS

| | | | |
|---|---|---|---|
| 4,904,165 | A | 2/1990 | Fraser, Jr. et al. |
| 4,978,285 | A | 12/1990 | Da Costa |
| 5,062,779 | A | 11/1991 | Da Costa |
| 5,141,420 | A | 8/1992 | Nambiar |
| 5,380,176 | A | 1/1995 | Kikuchi et al. |
| 5,407,335 | A | 4/1995 | Caillat et al. |
| 5,411,384 | A | 5/1995 | Bass et al. |
| 5,451,148 | A | 9/1995 | Matsuzaki et al. |
| 5,593,294 | A | 1/1997 | Houghtby et al. |
| 5,632,609 | A | 5/1997 | Hashimoto |
| 6,027,321 | A | 2/2000 | Shim et al. |
| 6,132,191 | A | 10/2000 | Hugenroth et al. |
| 6,139,291 | A | 10/2000 | Perevozchikov |
| 6,179,589 | B1 | 1/2001 | Bass et al. |
| 6,299,423 | B1 | 10/2001 | Perevozchikov |
| 6,537,043 | B1 | 3/2003 | Chen |
| 6,749,412 | B2 | 6/2004 | Narasipura et al. |
| 7,018,183 | B2 | 3/2006 | Haller et al. |
| 7,160,088 | B2 | 1/2007 | Peyton |
| 2001/0014293 | A1 | 8/2001 | Tsumagari et al. |
| 2005/0142017 | A1 | 6/2005 | Liang et al. |

FOREIGN PATENT DOCUMENTS

| | | |
|---|---|---|
| GB | 1 210 013 | 10/1970 |
| JP | 3-222883 | 10/1991 |
| JP | 3-242483 | 10/1991 |
| JP | 5-157066 | 6/1993 |
| JP | 5-157067 | 6/1993 |
| JP | 5-272472 | 10/1993 |

OTHER PUBLICATIONS

First Office Action issued by the Chinese Patent Office on Sep. 21, 2007 regarding Application No. 200410068732.0.

Second Office Action issued by the Chinese Patent Office on Oct. 1, 2008 regarding Application No. 200410068732.0.

Third Office Action issued by the Chinese Patent Office on Mar. 6, 2009 regarding Application No. 200410068732.0.

Office Action Issued by the United States Patent and Trademark Office on Mar. 10, 2009, for U.S. Appl. No. 11/651,684; 9 Pages.

SCROLL MACHINE

Matter enclosed in heavy brackets [ ] appears in the original patent but forms no part of this reissue specification; matter printed in italics indicates the additions made by reissue.

FIELD OF THE INVENTION

The present invention relates to rotary compressors. More particularly the present invention relates to a unique retention system for a direct discharge valve system that is utilized in a scroll compressor.

BACKGROUND AND SUMMARY OF THE INVENTION

Scroll machines are becoming more and more popular for use as compressors in both refrigeration as well as air conditioning and heat pump applications due primarily to their capability for extremely efficient operation. Generally, these machines incorporate a pair of intermeshed spiral wraps, one of which is caused to orbit relative to the other so as to define one or more moving chambers that progressively decrease in size as they travel from an outer suction port towards a center discharge port. An electric motor is normally provided that operates to drive the orbiting scroll member via a suitable drive shaft.

Because scroll compressors depend upon successive chambers for suction, compression, and discharge processes, suction and discharge valves in general are not required. However, the performance of the compressor can be increased with the incorporation of a discharge valve. One of the factors that will determine the level of increased performance is the reduction of what is called recompression volume. The recompression volume is the volume of the discharge chamber and the discharge port of the compressor when the discharge chamber is at its smallest volume. The minimization of this recompression volume will result in a maximizing of the performance of the compressor. In addition, when such compressors are shut down, either intentionally as a result of the demand being satisfied, or unintentionally as a result of a power interruption, there is a strong tendency for the backflow of compressed gas from the discharge chamber and to a lesser degree for the gas in the pressurized chambers to effect a reverse orbital movement of the orbiting scroll member and its associated drive shaft. This reverse movement often generates noise or rumble, which may be considered objectionable and undesirable. Further, in machines employing a single phase drive motor, it is possible for the compressor to begin running in the reverse direction should a momentary power interruption be experienced. This reverse operation may result in overheating of the compressor and/or other inconveniences to the utilization of the system. Additionally, in some situations, such as a blocked condenser fan, it is possible for the discharge pressure to increase sufficiently to stall the drive motor and effect a reverse rotation thereof. As the orbiting scroll orbits in the reverse direction, the discharge pressure will decrease to a point where the motor again is able to overcome this pressure head and orbit the scroll member in the forward direction. However, the discharge pressure will again increase to a point where the drive motor is stalled and the cycle is repeated. Such cycling is undesirable in that it is self-perpetuating. The incorporation of a discharge valve can reduce or eliminate these reverse rotation problems.

A primary object of the present invention resides in the provision of a very simple and unique retention system for a discharge valve, which is associated with the non-orbiting scroll and which can easily be assembled into a conventional gas compressor of the scroll type without significant modification of the overall compressor design. The discharge valve operates to minimize the recompression volume and at compressor shut down operates to prohibit backflow of the discharge gas through the compressor and thus driving the compressor in the reverse direction. Prohibiting the reverse operation of the compressor eliminates the normal shut down noise and other problems associated with such reverse rotation. The retention system includes a wave ring retainer that is disposed within a groove in the non-orbiting scroll member. This groove is located adjacent the discharge valve. The wave ring retainer biases the discharge valve against the non-orbiting scroll member, but the wave ring retainer will deflect at a specified pressure to increase the flow area for the discharge gas.

These and other features of the present invention will become apparent from the following description and the appended claims, taken in conjunction with the accompanying drawings.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
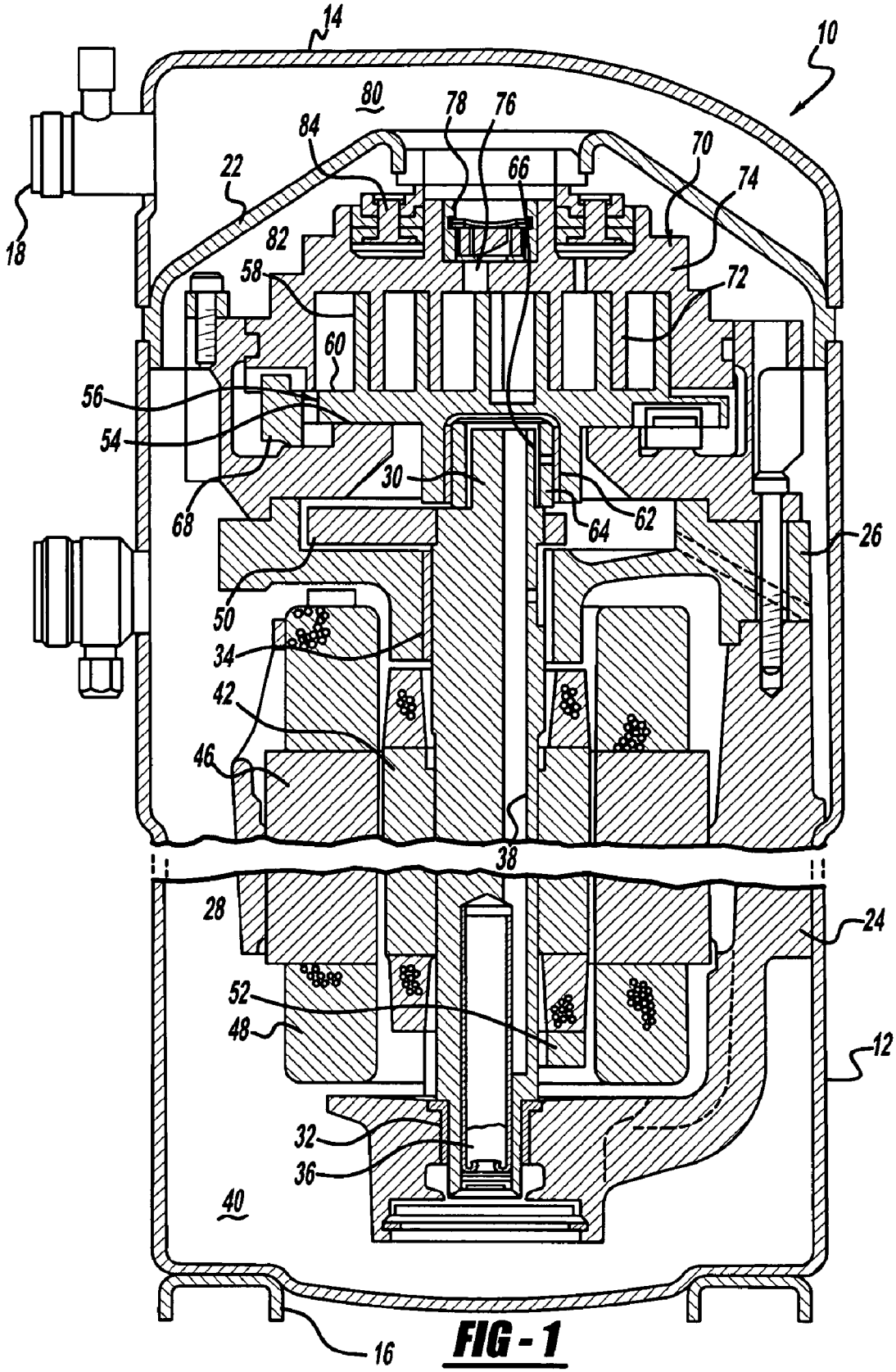
FIG. 1 is a vertical sectional view through the center of a scroll compressor that incorporates a retention system for a discharge valve assembly in accordance with the present invention.

Referring now to the drawings in which like reference numerals designate like or corresponding parts throughout the several views, there is shown in FIG. 1 a scroll compressor that incorporates a retention system for a discharge valving system in accordance with the present invention and which is designated generally by reference numeral 10. Compressor 10 comprises a generally cylindrical hermetic shell 12 having welded at the upper end thereof a cap 14 and at the lower end thereof a base 16 having a plurality of mounting feet (not shown) integrally formed therewith. Cap 14 is provided with a refrigerant discharge fitting 18. Other major elements affixed to the shell include a transversely extending partition 22 that is welded about its periphery at the same point that cap 14 is welded to shell 12, a lower bearing housing 24 that is suitably secured to shell 12 and a two piece upper bearing housing 26 suitably secured to lower bearing housing 24.

A drive shaft or crankshaft 28 having an eccentric crank pin 30 at the upper end thereof is rotatably journaled in a bearing 32 in lower bearing housing 24 and a second bearing 34 in upper bearing housing 26. Crankshaft 28 has at the lower end a relatively large diameter concentric bore 36 that communicates with a radially outwardly inclined smaller diameter bore 38 extending upwardly therefrom to the top of crankshaft 28. The lower portion of the interior shell 12 defines an oil sump 40 that is filled with lubricating oil to a level slightly above the lower end of a rotor 42, and bore 36 acts as a pump to pump lubricating fluid up crankshaft 28 and into bore 38 and ultimately to all of the various portions of the compressor that require lubrication.

Crankshaft 28 is rotatively driven by an electric motor including a stator 46, windings 48 passing therethrough and rotor 42 press fitted on crankshaft 28 and having upper and lower counterweights 50 and 52, respectively.

The upper surface of upper bearing housing 26 is provided with a flat thrust bearing surface 54 on which is disposed an orbiting scroll member 56 having the usual spiral vane or wrap 58 extending upward from an end plate 60. Projecting downwardly from the lower surface of end plate 60 of orbiting scroll member 56 is a cylindrical hub having a journal bearing 62 therein and in which is rotatively disposed a drive bushing 64 having an inner bore 66 in which crank pin 30 is drivingly disposed. Crank pin 30 has a flat on one surface that drivingly engages a flat surface (not shown) formed in a portion of bore 66 to provide a radially compliant driving arrangement, such as shown in Assignee's U.S. Pat. No. 4,877,382, the disclosure of which is hereby incorporated herein by reference. An Oldham coupling 68 is also provided positioned between orbiting scroll member 56 and bearing housing 24 and keyed to orbiting scroll member 56 and a non-orbiting scroll member 70 to prevent rotational movement of orbiting scroll member 56. Oldham coupling 68 is preferably of the type disclosed in Assignee's co-pending U.S. Pat. No. 5,320,506, the disclosure of which is hereby incorporated herein by reference.

Non-orbiting scroll member 70 is also provided having a wrap 72 extending downwardly from an end plate 74 that is positioned in meshing engagement with wrap 58 of orbiting scroll member 56. Non-orbiting scroll member 70 has a centrally disposed discharge passage 76 that communicates with an upwardly open recess 78 which, in turn, is in fluid communication with a discharge muffler chamber 80 defined by cap 14 and partition 22. An annular recess 82 is also formed in non-orbiting scroll member 70 within which is disposed a floating seal assembly 84. Recesses 78 and 82 and seal assembly 84 cooperate to define axial pressure biasing chambers, which receive pressurized fluid being compressed by wraps 58 and 72 so as to exert an axial biasing force on non-orbiting scroll member 70 to thereby urge the tips of respective wraps 58, 72 into sealing engagement with the opposed end plate surfaces of end plates 74 and 60, respectively. Seal assembly 84 is preferably of the type described in greater detail in U.S. Pat. No. 5,156,539, the disclosure of which is hereby incorporated herein by reference. Non-orbiting scroll member 70 is designed to be mounted to upper bearing housing 26 in a suitable manner such as disclosed in the aforementioned U.S. Pat. No. 4,877,382 or U.S. Pat. No. 5,102,316, the disclosure of which is hereby incorporated herein by reference.

Figure 2:
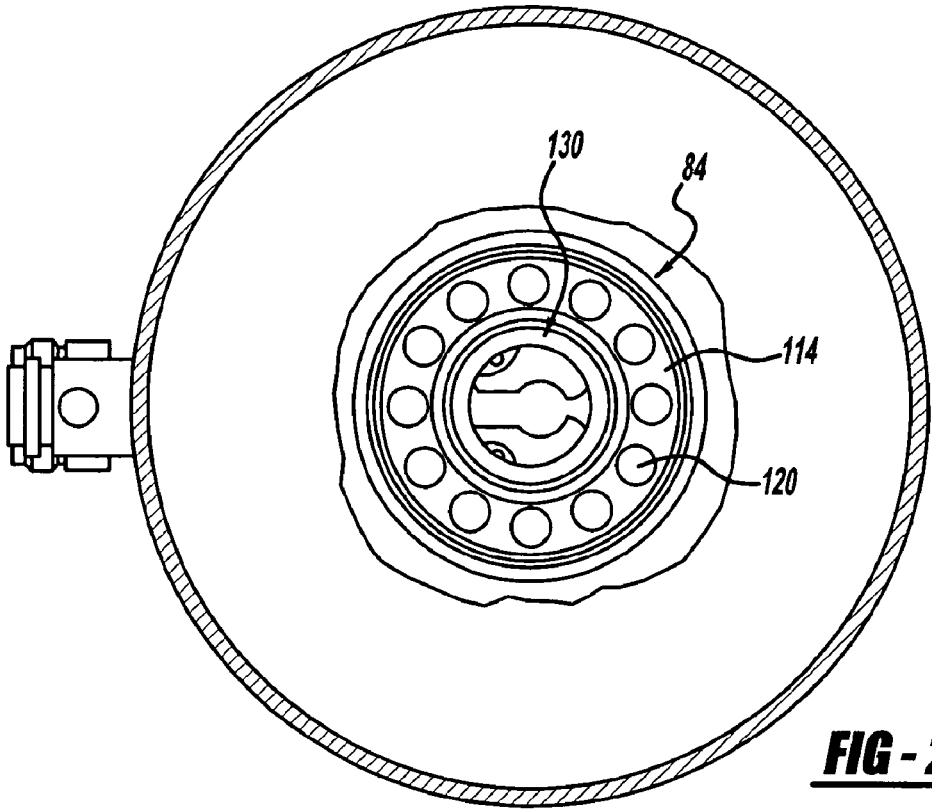
FIG. 2 is a top elevational view of the compressor shown in FIG. 1 with the cap and a portion of the partition removed.
Figure 3:
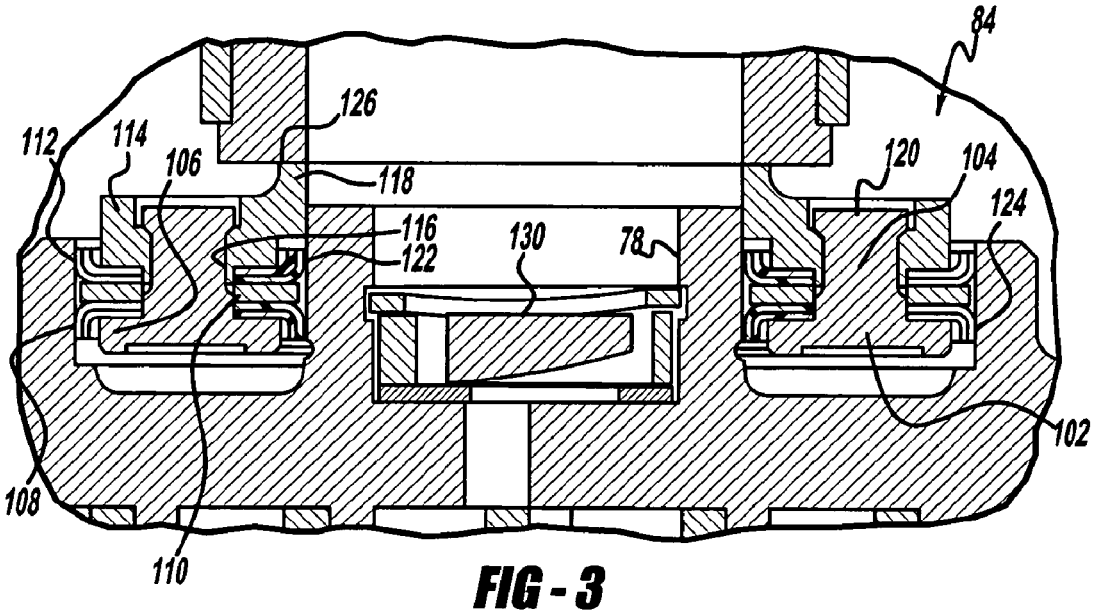
FIG. 3 is an enlarged view of the floating seal assembly and discharge valve assembly illustrated in FIG. 1.

Referring now to FIGS. 2 and 3, floating seal assembly 84 is of a coaxial sandwiched construction and comprises an annular base plate 102 having a plurality of equally spaced upstanding integral projections 104 each having an enlarged base portion 106. Disposed on plate 102 is an annular gasket assembly 108 having a plurality of equally spaced holes that mate with and receive base portions 106. On top of gasket assembly 108 is disposed an annular spacer plate 110 having a plurality of equally [spaces] *spaced* holes that also mate with and receive base portions 106. On top of plate 110 is an annular gasket assembly 112 having a plurality of equally spaced holes that mate with and receive projections 104. The assembly of seal assembly 84 is maintained by an annular upper seal plate 114, which has a plurality of equally spaced holes mating with and receiving projections 104. Seal plate 114 includes a plurality of annular projections 116, which mate with and extend into the plurality of holes in annular gasket assembly 112 and spacer plate 110 to provide stability to seal assembly 84. Seal plate 114 also includes an annular upwardly projecting planar sealing lip 118. Seal assembly 84 is secured together by swaging the ends of projections 104 as indicated at 120.

Referring now to FIG. 3, seal assembly 84 therefore provides three distinct seals: first, an inside diameter seal at two interfaces 122; second, an outside diameter seal at two interfaces 124; and, third, a top seal at 126. Seals 122 isolate fluid under intermediate pressure in the bottom of recess 82 from fluid under discharge pressure in recess 78. Seals 124 isolate fluid under intermediate pressure in the bottom of recess 82 from fluid under suction pressure within shell 12. Seal 126 is between sealing lip 118 and an annular seat portion on partition 22. Seal 126 isolates fluid at suction pressure from fluid at discharge pressure across the top of seal assembly 84.

The diameter and width of seal 126 are chosen so that the unit pressure between sealing lip 118 and the seat portion on partition 22 is greater than normally encountered discharge pressure, thus ensuring consistent sealing under normal operating conditions of compressor 10, i.e., at normal operating pressure ratios. Therefore, when undesirable pressure conditions are encountered, seal assembly 84 will be forced downward breaking seal 126, thereby permitting fluid flow from the discharge pressure zone of compressor 10 to the suction pressure zone of compressor 10. If this flow is great enough, the resultant loss of flow of motor-cooling suction gas (aggravated by the excessive temperature of the leaking discharge gas) will cause a motor protector to trip thereby the de-energizing motor. The width of seal 126 is chose so that the unit pressure between sealing lip 118 and the seat portion of partition 22 is greater than normally encountered discharge pressure, thus ensuring consistent sealing.

The scroll compressor as thus far broadly described is either now known in the art or is the subject of other pending applications for patent or patents of Applicant's Assignee.

Figure 4A:
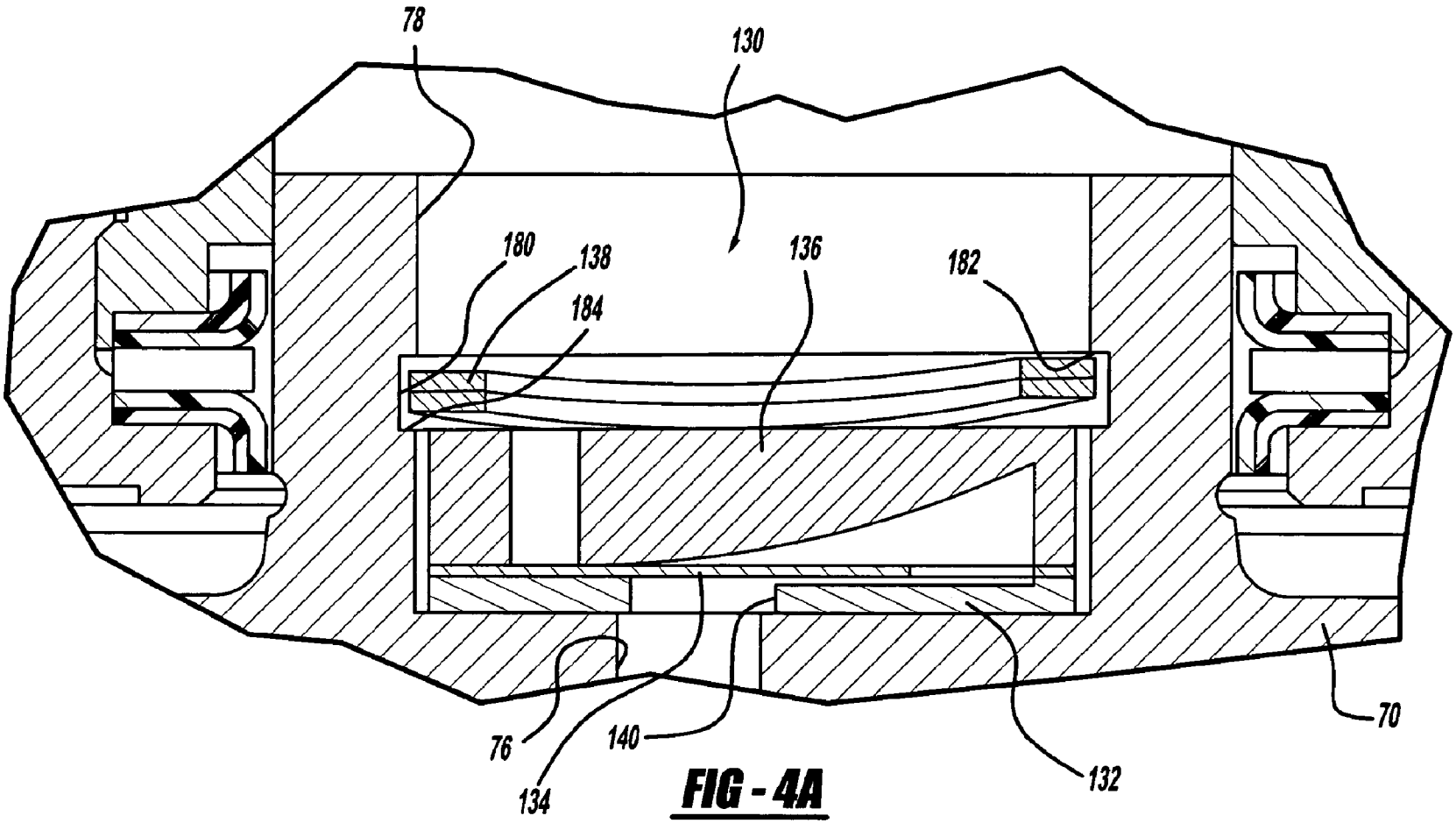
FIG. 4A is an enlarged view of the discharge valve assembly illustrated in FIGS. 1 and 3 with the discharge valve being biased against the non-orbiting scroll member.

The present invention is directed towards a retention system for a normally open mechanical valve assembly 130, which is disposed within recess 78, which is formed in non-orbiting scroll member 70. While the present invention is being described in conjunction with normally open mechanical valve assembly 130, the retention system of the present invention can be used with any other type of discharge valve also. Valve assembly 130 moves between a first or closed condition, a second or open condition, and a third or fully open condition during steady state operation of compressor 10. Valve assembly 130 will close during the shut down of compressor 10. When valve assembly 130 is fully closed, the recompression volume is minimized and the reverse flow of discharge gas through scroll members 56 and 70 is prohibited. Valve assembly 130 is normally open as shown in FIGS. 3 and 4A. The normally open configuration for valve assembly 130 eliminates the force required to open valve assembly 130 as well as eliminating any mechanical device needed to close valve assembly 130. Valve assembly 130 relies on gas pressure differential for closing.

Figure 4B:
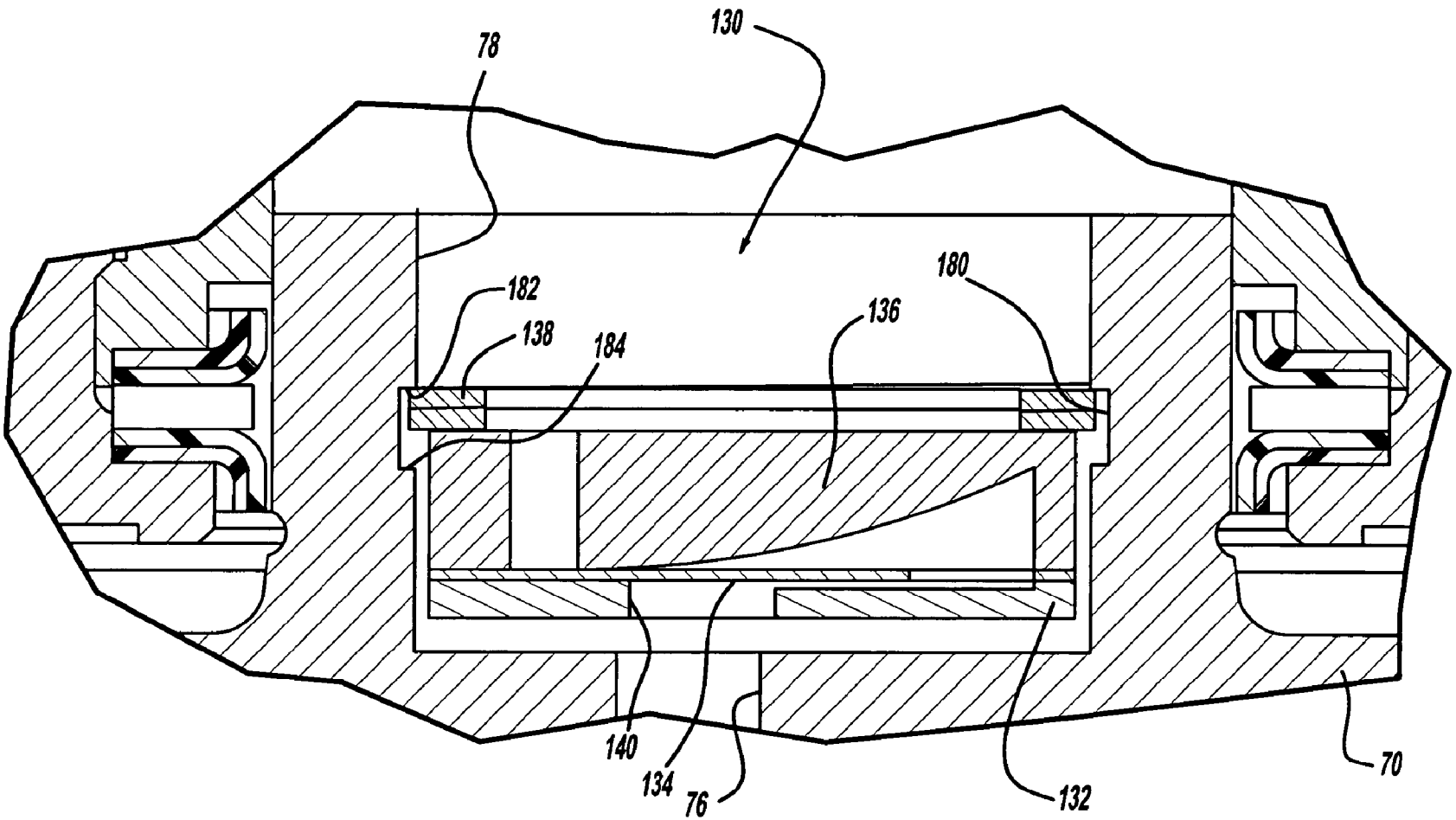
FIG. 4B is an enlarged view of the discharge valve assembly illustrated in FIGS. 1 and 3 with the discharge valve being spaced from the non-orbiting scroll member.
Figure 5:
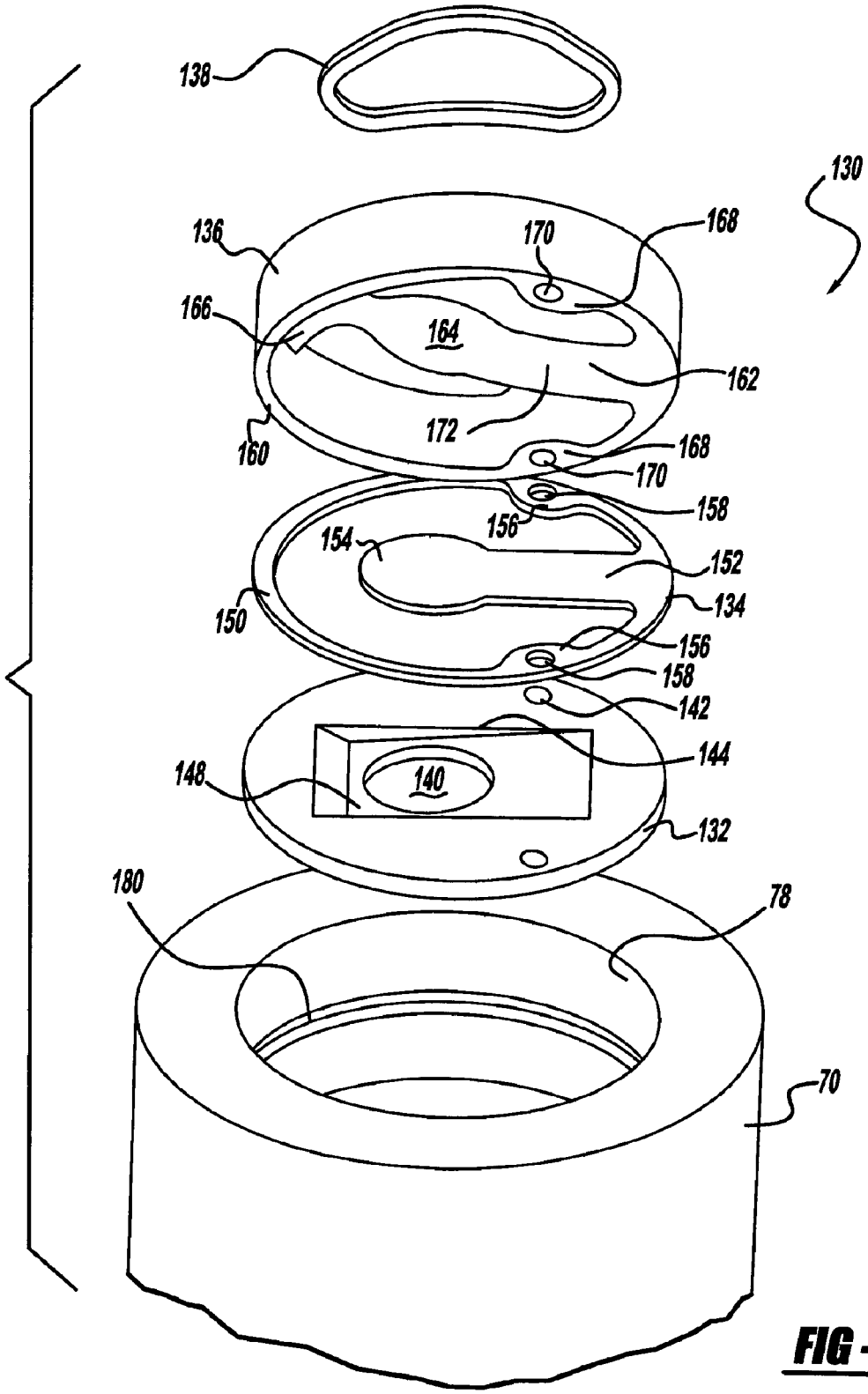
FIG. 5 is an exploded perspective view of the retention system of the discharge valve assembly shown in FIGS. 1 and 3.

Referring now to FIGS. 3-5, discharge valve assembly 130 is disposed within recess 78 and it comprises a valve seat 132, a valve plate 134, a valve stop 136 and a wave ring retainer 138. Valve seat 132 is a flat metal disc shaped member defining a discharge passage 140, a pair of alignment apertures 142 and a cavity 144. Non-orbiting scroll member 70 defines a pair of alignment bores. When apertures 142 are in registry with the alignment bores, discharge passage 140 is aligned with discharge passage 76. The shape of discharge passage 140 is the same as discharge passage 76. The thickness of valve seat 132, particularly in the area of cavity 144 is minimized to minimize the recompression volume for compressor 10, which increases the performance of compressor 10. The bottom surface of cavity 144 adjacent to valve plate 134 includes a contoured surface 148. The flat horizontal upper surface of valve seat 132 is used to secure valve plate 134 around its entire circumference. Contoured surface 148 of cavity 144 provides for the normally open characteristic of valve assembly 130. Contoured surface 148 may be a generally planar surface as shown in FIG. 4A or contoured surface 148 may be a curved surface. While cavity 144 and contoured surface 148 are shown as a pocket within valve seat 132, it is within the scope of the present invention to have cavity 144 and thus surface 148 extend through the edge of valve seat 132. Also, it is within the scope of the present invention to eliminate valve seat 132 and incorporate cavity 144 and surface 148 directly into and onto non-orbiting scroll 70 if desired.

Valve plate 134 is a flat thin metal disc shaped member that includes an annular ring 150, a generally rectangular portion 152 extending radially inward from ring 150 and a generally circular portion 154 attached to the radial inner end of rectangular portion 152. Rectangular portion 152 is designed to be smaller in width than circular portion 154. This reduced section therefore has a lower bending load than circular portion 154, which results in a faster opening of valve assembly 130. This reduced section of rectangular portion 152 is acceptable from a durability standpoint since contoured surface 148 reduces the stress loading on this reduced section. The size and shape of portion 154 is designed to completely cover discharge passage 140 of valve seat 132. The generally circular shape of portion 154 eliminates valve breakage that is associated with rectangular valve plates. In general, valve plates can have a tendency to twist during the closing of the valve due to the pressure fluctuations across the valve. When a rectangular shape valve twists before closing, the outside corner of the rectangle will hit first causing high loading and the breakage of the corner. The present invention, by using a generally circular portion to close the valve, eliminates the possibility of this corner breakage. Valve plate 134 also includes a pair of bosses 156, which define a pair of alignment apertures 158. When apertures 158 are in registry with apertures 142 of valve seat 132, rectangular portion 152 positions circular portion 154 in alignment with discharge passage 140. The thickness of valve plate 134 is determined by the stresses developed in rectangular portion 152 as valve plate 134 deflects from its closed position to its open position as described below.

Valve stop 136 is a thick metal, disc shaped member that provides support and backing for valve plate 134 and valve seat 132. Valve stop 136 is similar in configuration to valve plate 134 and includes an annular ring 160, a generally rectangular portion 162 extending radially inward from ring 160, a generally circular portion 164 attached to the radially inner end of rectangular portion 162 and a support section 166 extending between circular portion 164 and ring 160 on the side of portion 164 opposite to portion 162. Valve stop 136 also includes a pair of bosses 168, which define a pair of alignment apertures 170. When apertures 170 are in registry with apertures 158 in valve plate 134, rectangular portion 162 is aligned with rectangular portion 152 of valve plate 134 and it positions circular portion 164 in alignment with circular portion 154 of valve plate 134. Rectangular portion 162 and circular portion 164 cooperate to define a curved contoured surface 172.

Discharge valve assembly 130 is assembled to non-orbiting scroll member 70 by first placing valve seat 132 within recess 78 with contoured surface 148 facing upward while aligning apertures 142 with bores in recess 78 of [non-orbitinci] *non-orbiting* scroll member 70 which aligns passage 140 with passage 76. Next, valve plate 134 is placed on top of valve plate 132 within recess 78 while aligning apertures 158 with apertures 142, which aligns circular portion 154 with passage 140. Next, valve step 136 is placed on top of valve plate 134 within recess 78 while aligning apertures 170 within apertures 158, which aligns portions 162 and 164 with portions 152 and 154, respectively. A roll pin is inserted through each aligned set of apertures 170, 158 and 142 and press fit into each bore of [non-orbitinci] *non-orbiting* scroll member 70 to maintain the alignment of these components. Finally, retainer 138 is installed within recess 78 to maintain the assembly of valve assembly 130 with non-orbiting scroll member 70. The assembly of retainer 138 sandwiches the entire annular ring 150 of valve seat 132 between the upper flat surface of valve seat 132 and ring 160 of valve stop 136 to secure and retain valve plate 134.

Retainer 138 is a wave ring retainer that is disposed within a groove 180 formed into recess 78 of non-orbiting scroll member 70. The wave shape of retainer 138 causes it to engage both the upper surface 182 and the lower surface 184 of groove 180 to adequately retain discharge valve assembly within recess 78, as shown in FIG. 4A. The wave shape of retainer 138 also allows for axial movement of discharge valve assembly due to the resilience and, thus, compression of the wave ring retainer as shown in FIG. 4B.

Discharge valve assembly 130 is normally in a condition wherein valve plate 134 abuts the upper flat surface on valve seat 132. Contoured surface 148 spaces valve plate 134 from valve seat 132 to provide for the normally open characteristic of valve assembly 130. This allows limited fluid flow from discharge muffler chamber 80 into the compression pockets formed by scroll members 56 and 70. In order to close valve assembly 130, fluid pressure within muffler chamber 80 biases valve plate 134 against contoured surface 148 of valve seat 132 when the fluid pressure in chamber 80 is greater than the fluid pressure within the central most fluid pocket formed by scroll members 56 and 70. During operation of compressor 10, the fluid pressure differential between fluid in discharge chamber 80 and fluid within the central most fluid pocket formed by scroll members 56 and 70 will move valve plate 134 between abutment with contoured surface 148 of valve seat 132 and abutment with valve stop 136 or between a first closed position and a second open position. The normally open position of valve assembly 130 eliminates the force that is required to open a typical discharge valve. The elimination of this force lowers the pressure differential for operating the valve, which, in turn, lowers power losses. In addition the normally open feature reduces the sound generated during the closing of the valve due to the gradual closing of the valve rather than the sudden closure of a normally closed valve. Contoured surface 148 provides for this gradual closing feature. The valve of the present invention operates solely on pressure differentials. Finally, the unique design for valve assembly 130 provides a large flow area to improve the flow characteristics of the system.

When valve plate 134 is in its second or open position, additional discharge pressure within discharge passage will react against discharge valve assembly 130 and it will eventually exceed the spring force being applied by wave ring retainer 138. Discharge valve assembly 130 will then move axially upward to the position shown in FIG. 4B, the third or fully open position, to allow fluid flow around the outer periphery of discharge valve assembly 130.

Valve plate 134 is sandwiched between valve seat 132 and valve stop 136 with annular ring 160 of valve stop 136 abutting annular ring 150 of valve plate 134, which, in turn, abuts the upper flat surface of valve seat 132. Rectangular portion 152 and circular portion 154 normally lie in an unstressed condition in a generally horizontal position as shown in FIG. 4A. The deflection of valve plate 134 occurs in rectangular portion 152 and circular portion 154. To fully close, portions 152 and 154 deflect toward valve seat 132 and to open portions 152 and 154 deflect in the opposite direction toward valve stop 136. The stresses encountered by valve plate 134 are stresses that are both plus and minus in direction from the neutral normally open position. Thus, when comparing the stresses of valve plate 134 with those encountered by the flap valve of a normally closed discharge valve, the stresses are significantly reduced. The normally closed flap valve begins in a position adjacent a valve seat when the flap valve is unstressed. As the valve begins to open the stresses begin at the unstressed condition and continue to grow as the flap valve opens. Thus they are undirectional from the unstressed condition. The present invention, by centering the stressed conditions of valve plate 134 on both sides of the unstressed condition significantly reduces the stress loading experienced by valve plate 134.

In order to further reduce the stress loading and thus the life of valve plate 134, the shape of contoured surface 148 of valve seat 132 and contoured surface 172 of valve stop 136 are chosen to ensure a gradual loading and minimizing of the stresses by distributing the loads over a broader area. Finally, the rounded contours and transitions between ring 150, rectangular portion 152 and circular portion 154 are designed to eliminate stress risers. This elimination of stress risers, the equal distribution of the load and the reduction in the maximum stresses encountered significantly improves the life and performance for discharge valve assembly 130.

While the above detailed description describes the preferred embodiment of the present invention, it should be understood that the present invention is susceptible to modification, variation and alteration without deviating from the scope and fair meaning of the subjoined claims.

What is claimed is:

1. A scroll machine comprising:

a shell defining a discharge chamber;

a first scroll member having a first spiral wrap projecting outwardly from a first end cap;

a second scroll member having a second spiral wrap projecting outwardly from a second end cap, said second spiral wrap being intermeshed with said first spiral wrap;

a drive member for causing said scroll members to orbit relative to one another whereby said spiral wraps will create pockets of progressively changing volume between a suction pressure zone and a discharge pressure zone, said discharge pressure zone being in communication with said discharge chamber; and a discharge valve disposed between said discharge pressure zone and said discharge chamber, said discharge valve being disposed within a recess formed by said first scroll member, said discharge valve being movable between a first, a second, and a third position, wherein:

said first position is a closed position where said discharge valve abuts a bottom surface of said recess and fluid flow between said discharge chamber and said discharge pressure zone is prohibited;

said second position is an open position where said discharge valve abuts said bottom surface of said recess and fluid flow between said discharge chamber [and said discharge chamber] and said discharge pressure zone is permitted at a first flow level; and said third position is an open position where said discharge valve is spaced from said bottom surface of said recess and fluid flow between said discharge chamber and said discharge pressure zone is permitted at a second flow level greater than said first flow level.

2. The scroll machine according to claim 1, wherein said discharge valve moves axially with respect to said first scroll member.

3. The scroll machine according to claim 1, wherein fluid flows around an outer periphery of said discharge valve when said discharge valve is in said third position.

4. The scroll machine according to claim 1, wherein a passage between said first scroll member and said discharge valve is opened when discharge valve moves from said second position to said third position.

5. The scroll machine according to claim 1, wherein said discharge valve comprises a valve plate and a valve stop.

6. The scroll machine according to claim 5, wherein said valve plate moves with respect to said valve stop when *said* discharge valve moves from said first position to said third position.

7. The scroll machine according to claim 5, wherein said valve plate moves with respect to said first scroll member when said discharge valve moves from said second position to said third position.

8. The scroll machine according to claim 1, wherein said discharge valve comprises a valve seat and a valve plate.

9. The scroll machine according to claim 8, wherein said valve plate moves with respect to said valve seat when said discharge valve moves from said first position to said second position.

10. The scroll machine according to claim 8, wherein said valve plate moves with respect to said first scroll member when said discharge valve moves from said second position to said third position.

11. The scroll machine according to claim 1, wherein said discharge valve comprises a valve seat, a valve plate and a valve stop.

*12. A scroll machine comprising:*

*a shell defining a discharge chamber;*

*a first scroll member having a first spiral wrap projecting outwardly from a first end plate;*

*a second scroll member having a second spiral wrap projecting outwardly from a second end plate, said second spiral wrap being intermeshed with said first spiral wrap;*

*a drive member for causing said scroll members to orbit relative to one another whereby said spiral wraps will create pockets of progressively changing volume between a suction pressure zone and a discharge pressure zone, said discharge pressure zone being in communication with said discharge chamber; and*

*a discharge valve assembly disposed between said discharge pressure zone and said discharge chamber, the complete assembly movable relative to said first scroll member and including a valve plate movable between a first open state and a closed state.*

*13. The scroll machine according to claim 12, wherein said discharge valve assembly moves axially with respect to said first scroll member.*

*14. The scroll machine according to claim 12, wherein said valve plate is normally in said first open state.*

*15. The scroll machine according to claim 12, wherein said discharge valve assembly is disposed within a recess formed by said first scroll member.*

*16. The scroll machine according to claim 12, wherein said discharge valve assembly further comprises a valve seat and a valve stop.*

*17. The scroll machine according to claim 16, wherein said valve plate moves with respect to said valve seat and said valve stop between said first open state and said closed state.*

*18. The scroll machine according to claim 16, wherein said valve plate engages said valve seat when said valve plate is in said closed state.*

*19. The scroll machine according to claim 16, wherein said valve plate is movable into a second open state.*

*20. The scroll machine according to claim 19, wherein said valve plate abuts said valve stop in said second open state.*

*21. The scroll machine according to claim 12, further comprising a biasing member applying a force on said discharge valve assembly to bias said discharge valve assembly in a first direction relative to said first scroll member.*

*22. The scroll machine according to claim 21, wherein said discharge valve assembly is movable in a second direction opposite to said first direction and against said force of said biasing member.*

*23. The scroll machine according to claim 12, wherein said discharge valve assembly is biased into engagement with said first scroll member.*

*24. The scroll machine according to claim 12, wherein said discharge valve assembly is movable between a first position and a second position relative to said first scroll member, said valve plate permitting communication between said discharge pressure zone and said discharge chamber when said discharge valve assembly is in either said first position or said second position and restricting communication between said discharge pressure zone and said discharge chamber when said valve plate is in said closed state and said discharge valve assembly is in said second position.*

*25. The scroll machine according to claim 24, wherein said discharge valve assembly abuts a surface of said first scroll member in said second position.*

*26. The scroll machine according to claim 24, further comprising a biasing member biasing said discharge valve assembly into said second position.*

*27. The scroll machine according to claim 24, wherein said discharge valve assembly is biased into said second position.*

*28. The scroll machine according to claim 12, wherein said discharge valve assembly and said valve plate cooperate to define a first open state, a second open state, a third open state, and a closed state.*

*29. The scroll machine according to claim 28, wherein said first open state, second open state, and said third open state provide three different flow levels between said discharge pressure zone and said discharge chamber and said closed state restricts flow between said discharge pressure zone and said discharge chamber.*

*30. The scroll machine according to claim 21, wherein said biasing member is a wave-ring.*

*31. The scroll machine according to claim 21, wherein said biasing member is received within a groove of said first scroll member.*

*32. The scroll machine according to claim 31, wherein said groove is an annular groove formed in a wall of said first scroll member.*

*33. The scroll machine according to claim 12, wherein movement of said valve plate between said first open state and said closed state is independent of movement of said discharge valve assembly relative to said first scroll member.*

* * * * *